April 27, 1965 H. WESSNER 3,180,546

AUTOMATIC FILM THREADING DEVICE

Filed May 1, 1962

United States Patent Office 3,180,546
Patented Apr. 27, 1965

3,180,546
AUTOMATIC FILM THREADING DEVICE
Harald Wessner, Vienna, Austria, assignor to Karl Vockenhuber and Christl Hauser, both of Vienna, Austria
Filed May 1, 1962, Ser. No. 191,521
Claims priority, application Austria, May 10, 1961,
A 3,681/61
2 Claims. (Cl. 226—91)

The present invention relates to an automatic film threader for cine equipment for substandard film, with two loop formers rotatably mounted, which are swung in when the film is threaded between feed sprocket and take-up sprocket, respectively, on the one hand, and the film channel on the other hand, and which are swung out from the range of the film loops when the substandard film equipment operates normally.

Numerous such arrangements have been suggested and also constructed, but all of them are of a complicated structure. Chiefly, the joint control of the loop formers and the film pressure plate require high constructive expenditures concerning its structure. Thus, such arrangements were applied only to equipments of the highest price class.

It is one object of the present invention to provide an automatic film threader of the type set forth above, which is of a simple construction, in order that its use may be considered in lower priced amateur equipments.

It is a further object of the present invention to provide an automatic film threader, wherein that existing substandard film equipment may be supplemented relatively easy by the device, designed in accordance with the present invention.

It is a further object of the present invention to provide an automatic film threader, wherein a visual setting is not required and the servicing of the device can take place in a dark room.

Figure 1:
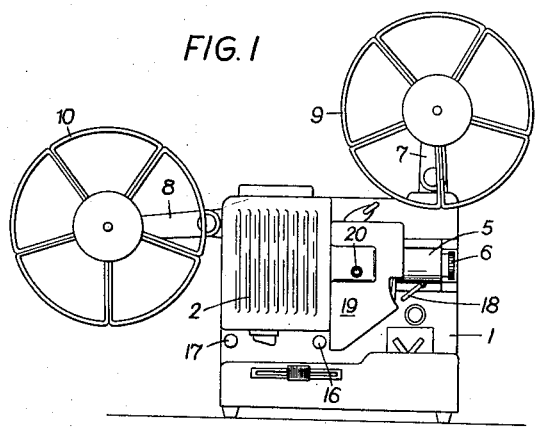
Figure 2:
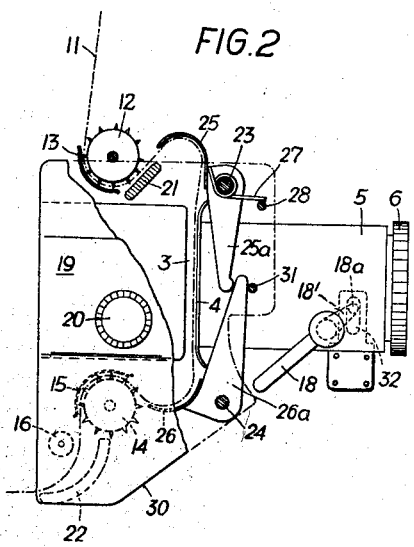
Figure 3:
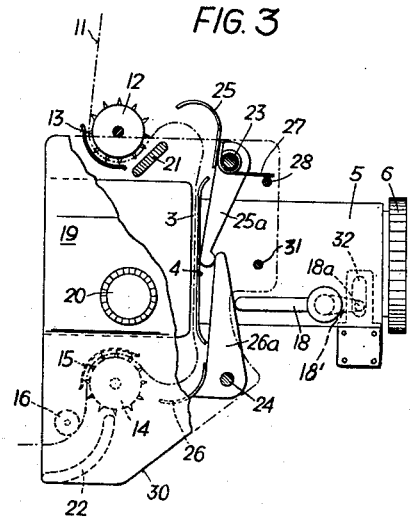

With these and other objects in view, which will become apparent in the following detailed description, the present invention will be clearly understood in connection with the accompanying drawing, in which:

FIG. 1 is a side elevation of a projector for substandard film with an automatic film threader; FIGS. 2 and 3 are enlarged side elevations of the projector in two different operating positions, wherein a part of the base plate of the film threader has been omitted, for the purpose of better demonstration.

Referring now to the drawing, the projector comprises a case 1 and a lamp housing 2 is provided on the front half of the case 1 of the substandard film projector. In front of the lamp housing 2a, film channel 3 with a film pressure plate 4 and a lens carrier 5 are arranged, the pressure plate 4 being secured to the lens carrier 5. A projection lens 6 is mounted adjustably in direction of the optical axis on the lens carrier 5. A film supply reel 9 and a pick-up reel 10 are rotatably mounted on reel arms 7 and 8. A film 11, which is unwound from the film reel 9, passes first the continuously driven feed sprocket 12, and the conventional perforation of the film 11 is held in mesh with the teeth of the sprocket 12 by stationary guide 13 secured to the projector. The film 11 is stepped on intermittently by a claw (not shown) provided in the film channel 3. The film 11 arrives at the take-up sprocket 14, which is likewise continuously driven and which has a guide 15. The film 11 is guided in known manner in form of loops between the feed sprocket 12 and take-up sprocket 14 and the film channel 3, which loops compensate the step-by-step motion of the film 11 in the film channel 3. The film arrives at the film spool 10 from the take-up sprocket 14 over guide rollers 16 and 17 arranged on the projector case 1, and is wound up on the film spool 10. A crank arm 18 is rotatably mounted on the axially movable lens carrier 5. The crank arm 18 is connected with a lever 18', which carries a pin 18a. The latter engages a guide bar 32, which is fastened to the projector case 1. By turning the crank arm 18 in clockwise direction, the lens carrier 5 and, thereby, the film pressure plate 4 are thus moved to the left, so that the film channel 3 is closed (FIG. 3).

If the crank arm 18 points downwardly, the film channel 3 is completely open. In the position shown in FIG. 2 the film channel 3 is open to an extent where the film can be easily inserted and is sufficiently guided in the film channel 3.

A plate 19 is mounted on the projector and fastened thereto by means of a milled-head screw 20. The plate 19 has two firmly arranged guides 21 and 22 and two pivot pins 23 and 24 on its surface facing the projector case 1. Film loop formers 25 and 26 are pivotally mounted on the pins 23 and 24, which carry levers 25a and 26a. Furthermore, a spring 27 is secured to the pivot 23, which spring 27 engages, on the one hand, the loop former 25 and, on the other hand, a bolt 28 provided on the plate 19. The loop former 25 is turned counter-clockwise by the action of the spring 27, whereby the lever arm 25a turns the lever arm 26a of the second loop former in clockwise direction and urges it against a bolt 31, secured to the plate 19.

In the position of the crank arm 18, disclosed in FIG. 2 the film 11 can be threaded. In order to achieve this end, a projector motor (not shown) is switched on and the end of the film 11 is inserted between the upper feed sprocket 12 and the guide 13 until the perforation of the film 11 is in engagement with the teeth of the sprocket 12. The guide 21 leads the film 11, which runs from the sprocket 12, to the loop former 25, the concave surface of which guides the film 11 downwardly into the film channel 3. After passing the film channel 3, the film 11 is guided through the loop former 26 to the take-up sprocket 14. The guide 22 leads the film 11, which emerges between the guide 15 and the sprocket 14, against the take-up reel 10. The threading procedure is thus completed. As soon as the film is secured to the spool 10, the crank arm 18 can be turned clockwise for about 45°, and the film channel 3 can thus be closed (FIG. 3). Thus the crank arm 18 comes into engagement with the lever arm 26a, whereby the loop former 26 is displaced in counter-clockwise direction. By means of the positive connection of the lever arms 25a and 26a the loop former 25 is likewise displaced outwardly from the area of the film loops.

The setting of the crank arm 18 in the position as shown in FIG. 2 is facilitated due to the fact that the lower edge 30 of the plate 19 is disposed in a linear extension of the crank arm 18 in the position "threading." By this means of orientation, a visual setting can be dispensed with in most instances. In a modification of this arrangement, a locking spring (not shown) for the crank arm 18 can be provided on the plate 19.

For the cleaning of the film gate, as well as for providing easy access to the film channel the plate 19 can be detached from the projector after loosening the milled-head screw 20.

While I have disclosed one embodiment of the present invention, it is to be understood that this embodiment is given by example only and not in a limiting sense, the scope of the present invention being determined by the objects and the claims.

I claim:
1. In an automatic film threader for substandard film apparatus, the combination with
   a case including a lamp housing,
   of a cover plate disposed laterally and removably secured to said case, a lens carrier disposed opposite said lamp housing and axially movable in said case, a pressure plate secured to the rear end of said lens carrier and movable therewith, two loop forming means pivotally mounted on said cover plate, said lamp housing and said pressure plate defining a film channel therebetween.

a feed sprocket and a take-up sprocket for feeding a film to and from, respectively, said film channel, said loop forming means being disposed between said feed sprocket and said take-up sprocket, respectively, and said film channel, each of said loop forming means comprising a loop forming portion and a lever, the free end of said levers engaging each other, spring means pivotally mounted on said cover plate and operatively connected with one of said levers, to urge said levers and, thereby, said loop forming portions into their operative loop forming positions, abutment means secured to said cover plate and within the path of at least one of said levers in order to limit the spring biased movement of said levers, a manually operated crank arm pivotally mounted on said lens carrier and shiftable into a "thread" position and a "run" position, respectively, means for moving axially said lens carrier and, thereby, said pressure plate towards said lamp housing upon shifting said crank arm from its "thread" position to its "run" position, in order to narrow said film channel, and said crank arm engaging in its "run" position one of said levers, for turning said levers and, thereby, said loop forming portions into their inoperative "run" position against the action of said spring means, so that said plate carrying loop forming means carried by said cover plate can be removably added to any substandard film apparatus.

2. The automatic film threader, as set forth in claim 1, wherein said crank arm is disposed at an acute angle to the longitudinal axis of said lens carrier in its inoperative "thread" position, and said plate has an edge portion aligned as an extension of said crank arm in the inoperative "thread" position of the latter.

References Cited by the Examiner
UNITED STATES PATENTS

| | | |
|---|---|---|
| 2,203,655 | 6/40 | Lechleitner et al. |
| 2,420,587 | 5/47 | Dietrich _____ 226—91 X |
| 2,832,258 | 4/58 | Chevallaz. |
| 2,983,416 | 5/61 | Hanken et al. _____ 226—91 |
| 3,057,530 | 10/62 | Mees _____ 226—91 |

SAMUEL F. COLEMAN, *Acting Primary Examiner.*

HARRISON R. MOSELEY, RAPHAEL M. LUPO, *Examiners.*